United States Patent [19]
Chen

[11] Patent Number: 5,148,314
[45] Date of Patent: Sep. 15, 1992

[54] OPTICAL SYSTEMS EMPLOYING REFRACTIVE AND DIFFRACTIVE OPTICAL ELEMENTS TO CORRECT FOR CHROMATIC ABERRATION

[76] Inventor: Chungte W. Chen, 33 Allegheny, Irvine, Calif. 92720

[21] Appl. No.: 710,859

[22] Filed: Jun. 6, 1991

[51] Int. Cl.$^5$ ............................................. G02B 5/00
[52] U.S. Cl. ..................................... 359/642; 359/16; 359/797
[58] Field of Search ......................... 359/642, 797, 16

[56] References Cited

U.S. PATENT DOCUMENTS 5,044,706  9/1991  Chen .................................. 359/356

Primary Examiner—Janice A. Howell
Assistant Examiner—Kiet T. Nguyen

[57] ABSTRACT

Optical structures are disclosed that comprise selected combinations of refractive and diffractive type optical elements wherein net chromatic aberrational effects are minimized in images formed by said structures. With the disclosed structures, chromatic aberrational contributions from each type of optical element, having characteristically opposite algebraic sense, are essentially cancelled out by means of proper distribution of optical power plus suitable arrangement and relative location of the said optical elements. Advantages over the prior art are demonstrated in four general types of optical structures.

10 Claims, 8 Drawing Sheets

OPTICAL SYSTEMS EMPLOYING REFRACTIVE AND DIFFRACTIVE OPTICAL ELEMENTS TO CORRECT FOR CHROMATIC ABERRATION

BACKGROUND OF THE INVENTION

All optical systems suffer from image aberrations. The ultimate quality and performance of an optical system is determined by the extent to which aberrations, particularly chromatic aberrations, are corrected. In the present invention, significant improvement is achieved over the prior art by minimizing chromatic aberrations. Additional advantages are obtained by reducing the number of optical elements needed to achieve equivalent or superior results.

The present invention relates generally to improved structure for assemblies of optical systems in which refractive and diffractive optical elements are combined advantageously to achieve significant improvement in chromatic aberration. The diverse characteristic properties of these two types of optical elements are cancelled out by suitably opposing and balancing these properties against each other to achieve hitherto unobtainable image quality.

In the prior art, achromatic lens assemblies have been employed with limited success since the time of Isaac Newton. In these achromats, two optical elements (one with positive power and one with negative power) made from conventional glass materials (e.g. crown and flint glass) with differing dispersive characteristics are combined to reduce net chromatic aberrational effects. Ever increasing sophistication with both methods and materials has been applied to the fundamental problem of correcting chromatic aberration, and powerful computational methods combined with development of special glass materials have achieved significant improvement. It is typical of such effort, however, that ever smaller incremental gains are achieved at continually increasing cost.

In examples of the immediate prior art, the use of binary optics has been proposed (reference 1) to correct axial chromatic aberration in an infrared optical system and (reference 2) to correct primary lateral chromatic aberration without aggravating the secondary chromatic aberration of an Erfle eyepiece.

Reference 1 is a paper by Gary. J. Swanson and Wilfred. B. Veldcamp, SPIE Poceedings, Vol. 885, Paper #22, 1988. They propose using binary optics to correct axial chromatic aberration. In binary optics, the functional effect of a grating is achieved with grooves that are etched with typical fabrication processes employed in microelectronics. Their system has serious deficiencies, because as numerical aperture increases, marked spherochromatism is exhibited. Consequently, the minimum useable f-number is severly limited. This limitation is particularly unfortunate in advanced infrared optical systems that require low f-numbers (typically f/1.0 to f/1.5) to help reduce size and weight.

Reference 2 is by D. Shafer and T. McHugh of the Perkin-Elmer Corporation: "Binary Optics Design Surprises for the 1990's," SPIE, Orlando, Fla (March 1989). Binary optics are used to correct lateral chromatic aberration of an Erfle eyepiece without aggravating secondary chromatic aberration. Unfortunately, their approach is applicable only to systems with low numerical aperture (high f-number) and modest fields of view, as is characteristic of the Erfle eyepiece. As the aperture stop is opened, spherochromatism, chromatic coma, axial primary color, and axial secondary color are aggravated severely. Similarly, as field of view increases, chromatic distortion and chromatic coma are aggravated severely.

SUMMARY OF THE INVENTION

The present invention has many important and novel features. Many deficiencies of the prior art are substantially reduced or eliminated, such as those associated with f-number and field of view. Several kinds of chromatic aberration are corrected including axial primary, axial secondary, lateral primary, and lateral secondary. Correction is provided for all orders of spherochromatism, chromatic coma, and chromatic distortion. In the spectral intervals between the three selected design wavelengths, residual chromatic aberrations are significantly reduced.

In addition, a novel method is disclosed for correcting field curvature for all orders without introducing lateral chromatic aberrations. Because elements made of special optical glass need not be employed, cost is reduced and substantial resistance to radiation damage is obtained. Finally, because these improvements are achieved with fewer optical elements in the optical structure, cost, size, and weight are reduced.

The use of this invention will improve significantly the image quality of optical systems including both refractive and catadioptric types and will apply over wavelengths ranging from the ultraviolet to the infrared. The structure disclosed for axial chromatic aberration, axial secondary color, and spherochromatism is well suited for telephoto lens systems. The structure that is disclosed to correct lateral chromatic aberration, secondary lateral color, chromatic distortion and chromatic coma is particularly effective for optical systems employing external pupils. The structure disclosed for correcting field curvature without aggravating lateral chromatic aberration is particularly useful for optical systems with wide fields of view and for systems employing Petzval type lenses.

The considerable advantages of this invention are achieved through the use of carefully selected combinations and distributions of refractive and diffractive optics that are employed so that net resulting aberrational effects are substantially reduced relative to what can be achieved with the exclusive use of refractive optical components.

Examples of typical wavelength response will demonstrate the value of forming optical structures employing this invention. Chromatic aberrations result from the varying characteristic response as a function of wavelength for the optical element. An important example is the variation of focal length along the central axis. For a typical glass achromat, consider that the effective focal length (EFL) as a function of wavelength exhibits a minimum value near the central wavelength region over which it operates. On the other hand, a corresponding EFL of a typical glass-diffractive achromat exhibits a maximum value near its central wavelength region of operation. As will be explained subsequently, these characteristic aberrations of opposite algebraic sense can be matched so that they essentially cancel each other to reduce overall chromatic aberration in the complete lens structure. Finally, the special optical glasses that are eliminated have at least two disadvantages: they are more expensive and have substantially less resistance to damage from radiation.

BRIEF DESCRIPTION OF THE DRAWINGS

The advantages and novel features of the disclosed invention will be appreciated readily by persons skilled in the art from the following detailed description when read in conjunction with the drawings herein.

FIG. 8(a-b) illustrate two typical well designed optical structures for a Petzval lens with an external pupil.

FIG. 9 shows the H tan U optical performance curves for the conventional glass-refractive lens shown in FIG. 8a.

FIG. 11 shows the MTF performance curves for the conventional all-glass lens shown in FIG. 8a.

DETAILED DESCRIPTION OF THE DISCLOSURE

Figure 1:
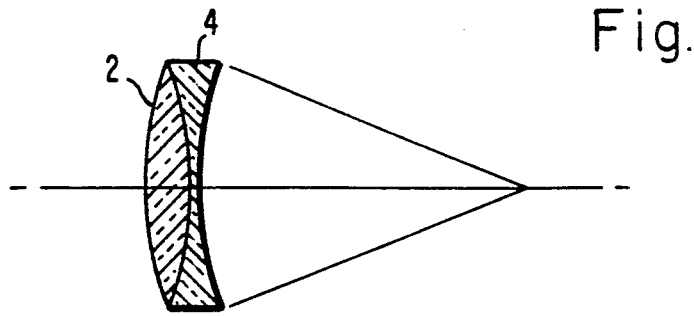
FIG. 1 illustrates a typical conventional achromatic lens (glass-refractive) employing an assembly or structure of two refractive optical elements. A positive element of crown glass and a negative element of flint glass are employed.

In the following detailed description and in the several figures provided, like elements are identified with like reference numerals.

To assure good image quality, typical high quality optical systems require proper corrections for chromatic aberrational effects. These aberrations include primary axial color, primary lateral color, secondary axial color, and secondary lateral color. With primary correction, proper correction is achieved at only two specific design wavelengths within the operating spectral interval. With secondary correction, proper correction is achieved at three specific design wavelengths. Aberrations for primary axial color and primary lateral color are usually corrected through the use of either cemented or air-spaced achromats.

Secondary color correction, however, has proven to be difficult in the prior art. Such correction generally requires the use of expensive special glass materials. The utility of special glass materials results from their unusual characteristics of index of refraction as a function of wavelength as compared to conventional glass materials. Some examples of such special glasses are KZFS1, KZFSN2, KZFSN5, and LGSK2. These special glasses are needed because if normal glasses are used to assemble an achromat, secondary color contributions (having the same algebraic sense) from the two elements are additive.

The significant advantages obtained with this invention result from assembling and combining the two types of optical elements with diverse (i.e. having opposite algebraic sense) spectral characteristics and chromatic aberrational contributions into structures exhibiting marked improvement in net chromatic aberrational effects over approaches employed in the prior art. This improvement results from suitably arranging and locating optical elements relative to each other plus appropriately distributing optical power of these elements throughout the structure so as to cancel out essentially the chromatic aberrational contributions from each of the two types of optical elements.

A glass-diffractive element comprises at least two portions. One portion functions refractively and contains at least one refractive element. The second portion functions diffractively and contains at least one diffractive element. The diffractive portion is applied to, formed upon, or otherwise physically associated with the refractive portion. Diffractive elements can take several physical forms, but all forms function on the basis of the grating equation:

$$\sin A = nL/d - \sin I$$

where the following notation applies:
  A: angle of diffraction
  I: angle of incidence
  L: wavelength
  n: order of diffraction
  d: spacing of adjacent lines on the grating Diffractive elements can be circular (Fresnel zone plate), rectangular, or of any other suitable shape. They can be formed with ruled grooves or etched lines. They also can be blazed for enhanced performance at particular wavelengths. One form of etched diffractive elements, called binary optics, is applicable for purposes of this invention.

In the prior art, two approaches are employed for making achromatic optical assemblies with perfect correction at three selected design wavelengths. In the first approach, conventional glass achromats are replaced with apochromats, which are expensive. An apochromat consists of at least two refractive optical elements, at least one of which is made of special optical glass. In the second approach, more refractive optical elements are inserted into the system to reduce the optical power demanded of each individual element. Unfortunately with either of these approaches, optical systems become complicated and suffer from the higher orders of spacial and chromatic aberrations.

With the present invention, these fundamental problems are solved by utilizing to advantage the opposite algebraic sense for secondary axial chromatic aberration of the two different types of achromats previously described, i.e. glass-refractive and glass-diffractive. Proper distribution of optical power among glass-refractive and glass-diffractive achromats can correct simultaneously for contributions to both primary and secondary axial chromatic aberration. With this construction, special glasses typically used in the prior art are not necessary.

An additional advantage of the combined glass-diffractive lens structure is that optical power demanded from each individual optical element of the achromat is reduced but in a manner different from that employed in the prior art with glass-refractive structures, i.e. not by merely introducing more refractive elements. With the present invention, optical power required from individual elements can be reduced because in a glass-diffractive achromat only elements (both refractive and diffractive) with positive optical power are needed; whereas in an glass-refractive achromatic lens both positive and negative elements must be employed. As a result, structures employing glass-diffractive elements as prescribed by this invention achieve significant improvement in Petzval curvature, higher order spacial aberrations, and higher order chromatic aberrations.

A further application of this invention is to employ glass-diffractive elements to correct for primary lateral color. When using a glass-diffractive element with a very small amount of primary axial chromatic aberration near the image plane, a significant amount of beneficial primary lateral chromatic aberration will be introduced as a result of the large ratio of chief ray height to marginal ray height. A chief ray lies at the edge of the image; the marginal ray lies at the center of the image. Although a conventional glass doublet performs a similar function, its use generally upsets the correction for the Petzval curvature and introduces higher order aberrations.

An additional advantage of this invention is the use of combinations of glass-diffractive elements to correct for chromatic distortion. Such correction is related to the approach just described for introducing beneficial primary lateral chromatic aberration. If a corrective higher order (i.e. third order and higher order) aspherical wavefront is encoded in the diffractive portion of the glass-diffractive element described above, chromatic distortions of all orders can be corrected simultaneously. Such encoding is achieved, for example, by varying appropriately the spacing between lines of a Fresnel zone plate as a function of radius.

Figure 2:
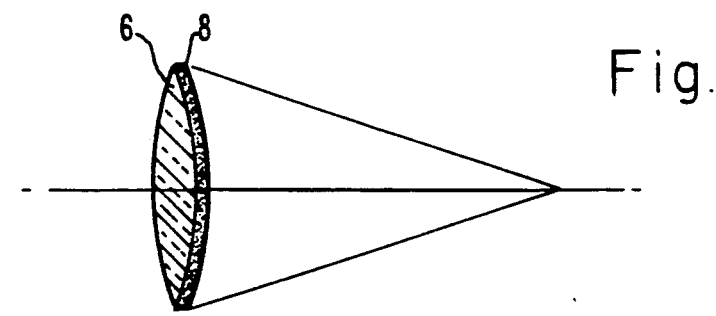
FIG. 2 illustrates a typical glass-diffractive achromat whose use is important to this invention. The assembly or structure consists of a conventional refractive optical element or lens made of either flint or crown glass, upon at least one surface of which a diffractive element (e.g. grating or Fresnel zone plate) has been applied, attached, or formed.

FIG. 1 shows a conventional glass-refractive achromat with two elements. It consists of an assembly of a crown glass element 2 with positive optical power and a flint glass element 4 with negative optical power. FIG. 2 shows a comparable glass-diffractive achromat assembled with a conventional refractive element 6 of positive optical power and a diffractive element 8 also with positive optical power applied to or formed upon the refractive element. It is important to note that typical diffractive elements are extremely thin and occupy virtually zero space in optical structures that employ them.

Figure 3:
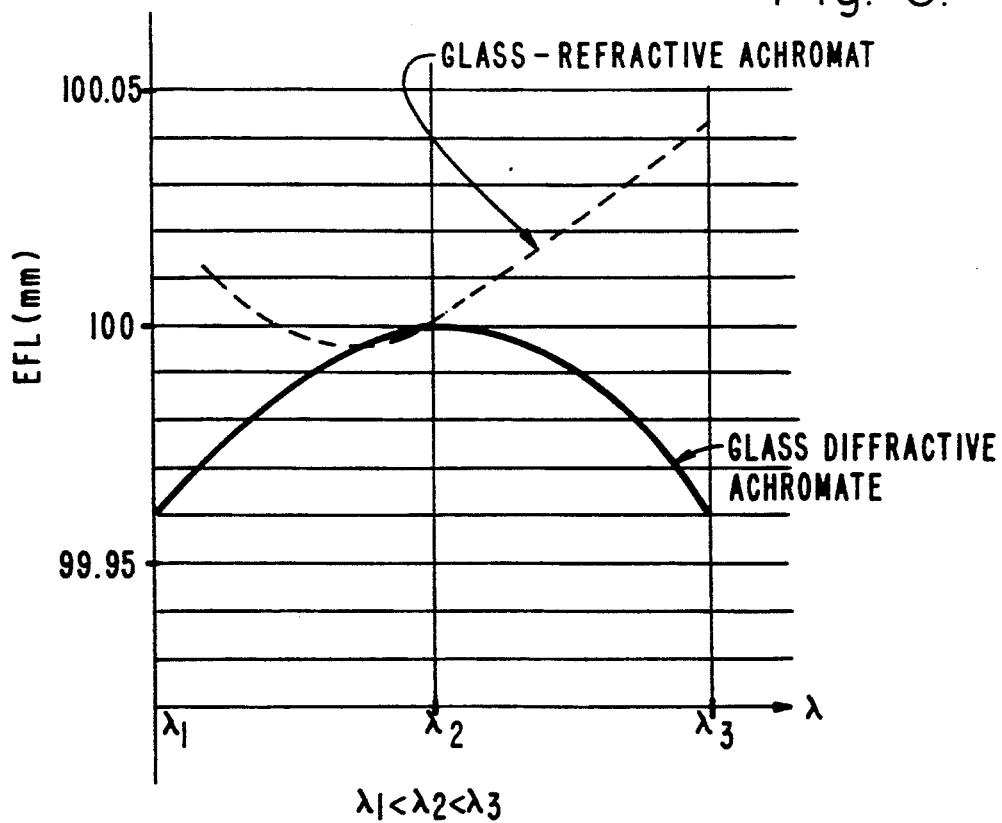
FIG. 3 shows typical curves of effective focal length (EFL) as a function of wavelength for two basic optical structures of the types illustrated in FIGS. 1 and 2. The upper curve is for a glass-refractive achromat; the lower curve is for a glass-diffractive achromat.

FIG. 3 illustrates some significant differences in performance of these two achromats involving the effective focal length (EFL) that is exploited to great advantage in this invention. It is seen in this figure that EFLs as a function of wavelength for (a) a typical refractive glass achromat and (b) for a typical glass-diffractive achromat are of significantly different shape. Although the vertical scale is greatly expanded, FIG. 3 shows that for a typical glass-refractive achromat, minimum EFL occurs in the central wavelength region, while at the outer wavelengths EFLs are longer. For the glass-diffractive achromat, maximum EFL occurs in the central wavelength region, while shorter EFLs pertain in the outer wavelength regions.

This marked difference in performance results from the opposite algebraic signs for the associated Abbe numbers for glass refractive elements and for diffractive elements. Abbe number is defined as $(N2-1)/(N1-N3)$. The N values refer to index of refraction associated with corresponding wavelengths having increasing values: L1, L2, and L3. Because the Abbe number for any kind of glass is always positive, EFLs for central wavelengths over the spectral range of a glass achromat must be shorter than those for outer wavelengths. It follows that secondary axial chromatic aberration cannot be corrected properly using a series of different glass achromats.

The novel method employed in this invention for correcting chromatic aberration is to utilize the opposite algebraic sense previously established in this disclosure for the secondary axial chromatic aberrations of these two different types of achromats. By properly distributing optical power among a plurality of achromats, both primary axial and secondary axial chromatic aberrations can be corrected simultaneously. Thus, it has been shown (1) that there is no need for optical elements made of special glass materials as required in the prior art and (2) that the optical power required of each individual optical element of the achromats is reduced. Further, significant reductions are achieved in Petzval curvature, higher order aberrations, and higher order chromatic aberrations.

Major advantages of this invention over the prior art will be illustrated schematically and described in detail with the aid of four general optical structures that span a significant range of practical and high quality applications.

Figure 4A:
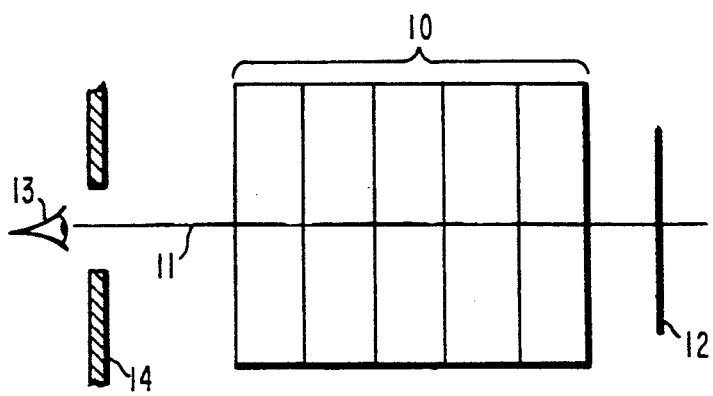
FIG. 4(a-b) are a general schematic diagram representing two typical optical structures for an eyepiece lens. Structures are shown for both a conventional lens and a comparable lens employing the principles of the present invention.
Figure 4B:
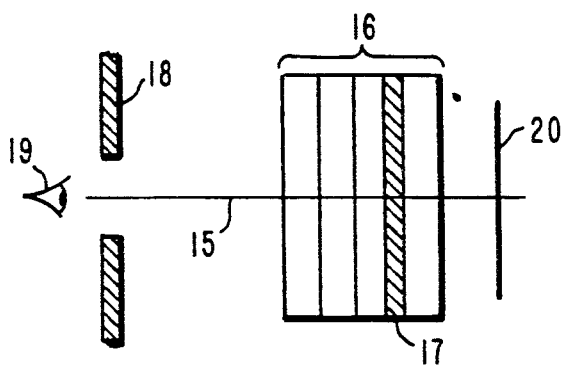

FIG. 4 illustrates two general schematic diagrams for eyepiece lenses. FIG. 4a shows a typical eyepiece employing conventional construction. FIG. 4b shows a comparable eyepiece lens that employs the principles of this invention. In the conventional structure (FIG. 4a), lens group 10 contains a plurality of refractive elements with positive optical power overall. Eye 13 is located near aperture stop 14 at the left end of optical axis 11; image 12 being viewed by the eye is shown at the far end of the optical axis at the right.

In the structure of FIG. 4a, it is difficult to correct simultaneously for lateral color, distortion, chromatic distortion, and field curvature. Further, this structure contains more optical elements than that of FIG. 4b.

In the glass-diffractive structure of FIG. 4b, lens group 16 with positive optical power contains at least one refractive optical element and at least one diffractive optical element. In this example, diffractive element 17 is placed between the third and fourth refractive elements of lens group 16. It is understood that detailed arrangements and locations of optical elements within lens group 16 other than those described in this example are consistent with the spirit of this invention. Eye 19 and aperture stop 18 are located in a fashion similar to that shown in FIG. 4a. Image 20 being viewed by the eye is shown at the far end of optical axis 15. In schematic diagram FIG. 4b, the significantly smaller size of the structure obtained employing the principles of this invention is evident when compared to the corresponding conventional structure. In this eyepiece structure, lateral color, distortion, chromatic distortion, and field curvature are easily corrected by employing a single diffractive optical element. The structure contains fewer refractive optical elements, and is more compact than that of FIG. 4a. Further, eye relief is long, and field of view is large.

Figure 5A:
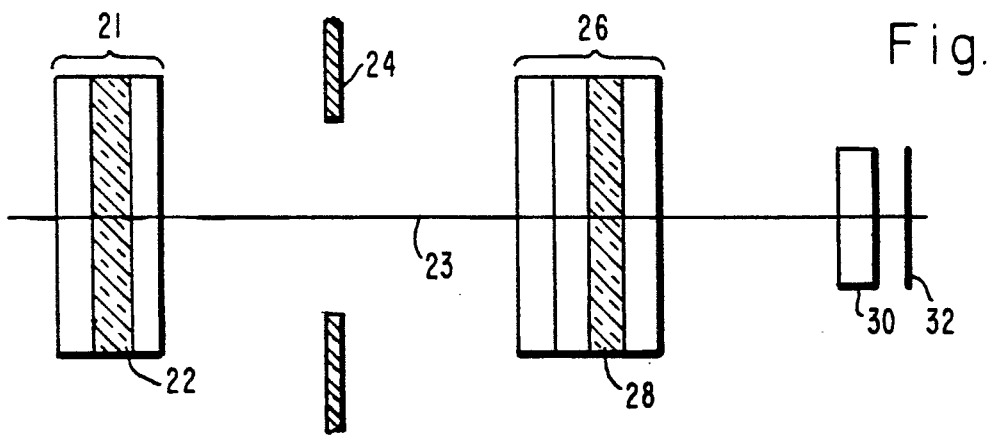
FIG. 5(a-b) are a general schematic diagram representing two typical optical structures for a Petzval lens, which in this example has an internal pupil. Both a conventional lens and an equivalent lens employing the present invention are shown.
Figure 5B:
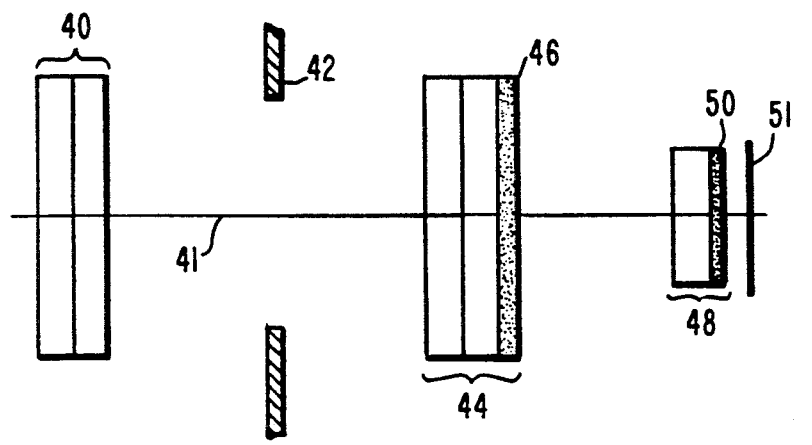

FIG. 5 illustrates two general schematic diagrams for Petzval lenses that in this example contain an internal aperture stop (also called a pupil). Each of these structures employs three lens groups. FIG. 5a shows a typical conventional structure for a Petzval lens; FIG. 5b shows a comparable structure employing the principles of this invention.

In the conventional structure, input lens group 21, located at the left end of optical axis 23, contains refractive elements with positive overall optical power. At least one element (shown in this example as 22) of lens group 21 is made of special optical glass. Aperture stop 24 is located to the right of lens group 21. Lens group 26 to the right of the aperture stop consists of refractive optical elements with positive overall optical power. At least one refractive element (shown in this example as the third element from the left 28) in lens group 26 is made of special optical glass. The last optical element on the right end of the optical axis is field lens 30. Image 32 is formed at the far right end of the optical axis.

For the structure of FIG. 5a, it is important to note that special optical glass is required in lens group 21, lens group 26, or both. Aperture size is limited because otherwise it is difficult to correct simultaneously for spherochromatism and secondary color aberrations. Field of view is limited because otherwise it is difficult to correct simultaneously for both field curvature and lateral color aberrations. Finally, this structure is larger than that of FIG. 5b because more optical elements are required.

FIG. 5b shows an equivalent typical structure for a Petzval lens employing the principles of this invention. Input lens group 40 at the left end of optical axis 41 contains refractive elements with overall positive optical power. Internal aperture stop 42 is located to the right of lens group 40. Lens group 44 to the right of the aperture stop in this figure contains refractive optical elements and at least one diffractive optical element. It is within the spirit of this invention to include alternatively at least one diffractive element in either lens group 40 or lens group 44, or to employ diffractive elements in both lens groups. The overall optical power of lens group 44 is positive. In this example, one element of lens group D (shown as the right-most element 46) is diffractive. It is understood that detailed arrangements and locations of such refractive and diffractive optical elements of lens group 44 other than those described in this example are within the spirit of this invention. Field lens group 48 lies next to the right along the optical axis and contains refractive elements and at least one diffractive optical element. In this example, one element of the field lens group (shown as element 50 on the right) is diffractive. Image 51 is formed to the right of field lens group 48.

Comparison of the two Petzval lenses in FIG. 5 demonstrates substantial advantages obtained from the use of this invention. In the glass-diffractive structure of FIG. 5b, fewer optical elements are required and as a result, the overall structure is more compact. Spherochromatism and secondary color aberrations can be corrected simultaneously with suitable employment of diffractive optical elements in lens group 40, lens group 44, or both. Special optical glass is not needed. Aperture size is larger than that for the conventional structure of FIG. 5a. Employing at least one diffractive element in the field lens group permits simultaneous correction for both field curvature and lateral color. A larger field of view is obtained as a result of achieving better correction for lateral color aberrations and field curvature.

Figure 6A:
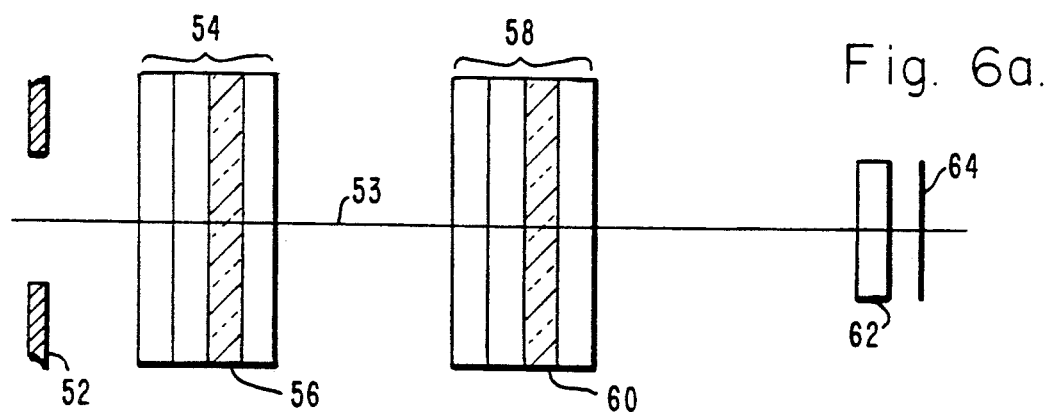
FIG. 6(a-b) are a general schematic diagram representing two typical optical structures for a lens with an external pupil and with a large aperture. Both a conventional lens and a comparable lens employing the principles of the present invention are shown.
Figure 6B:
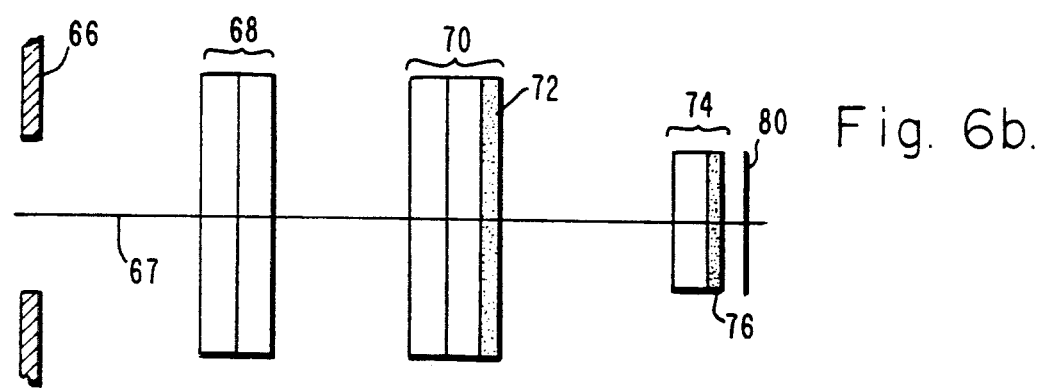

FIG. 6 illustrates two general schematic diagrams for large aperture lenses with an external pupil. Each of these structures employs three lens groups. FIG. 6a shows a conventional structure, and FIG. 6b shows a comparable structure employing the principles of this invention.

For the typical conventional structure in FIG. 6a, input aperture stop 52 is at the left end of optical axis 53. Next to the right along the optical axis is lens group 54 that contains refractive optical elements with positive overall optical power. At least one element in lens group 54 is made of special optical glass. In this example, lens group 54 contains four refractive elements, and the third element from the left 56 in lens group 54 is made of special optical glass. In actual practice of the prior art, other arrangements and locations of such refractive optical elements employed throughout this typical structure need not affect the illustrative value of this example. Next along the optical axis to the left is lens group 58 that contains refractive optical elements having positive overall optical power. At least one element in lens group 58 will be made of special optical glass. In this example, the third element from the left 60 in lens group 58 is made of special optical glass. The field lens group 62 is the last on the right and contains refractive elements. In this example, the field lens group contains one element. Image 64 is formed at the right end of the optical axis.

Significant features for the example of the prior art shown in FIG. 6a are as follows. Special optical glass is likely to be used in lens group 54, lens group 58, or both. Aperture size is limited because otherwise it is difficult to correct simultaneously for spherochromatism, secondary color, secondary lateral color, and chromatic coma. Field of view is limited because it is difficult to correct simultaneously for field curvature and lateral color. Because more optical elements are required, this structure is more bulky than the structure of FIG. 6b.

FIG. 6b shows a comparable optical structure for a typical large aperture lens with an external pupil employing the principles of this invention. External aperture stop 66 is at the left of the optical axis 67. Next to the left along the optical axis is lens group 68 that may contain both refractive and diffractive elements. In this example, lens group 68 contains only refractive optical elements with overall positive optical power. Next to the left is lens group 70 that contains both refractive and diffractive optical elements with overall positive optical power. In this example, the right-most element 72 of lens group 70 is diffractive. It is understood that detailed arrangements and locations of individual optical elements within lens groups 68 and 70 other than those described in this example are consistent with the spirit of this invention. Field lens group 74 is at the right end of the optical axis and contains refractive and diffractive optical elements. In this schematic example, of the two elements shown in the field lens, right element 76 is diffractive. Image 80 is formed to the right of the field lens group at the right end of the optical axis.

Comparison of the two lens structures of FIG. 6 reveals substantial advantage from the use of this invention are shown with the structure of FIG. 6b as follows. No special optical glass is needed. Spherochromatism, secondary color, secondary lateral color, and chromatic coma can be well corrected simultaneoulsy when employing diffractive optical elements alternatively in lens group 68 or lens group 70, or diffractive elements may be employed in both lens groups. The obtainable aperture size is larger than that for the conventional structure of FIG. 6a. Employing one or more diffractive elements in the field lens group allows field curvature and lateral color to be corrected simultaneously. A larger field of view is achieved as a result of better correction of lateral color and field curvature. Because fewer optical elements are used, the overall structure is smaller and lighter.

Figure 7A:
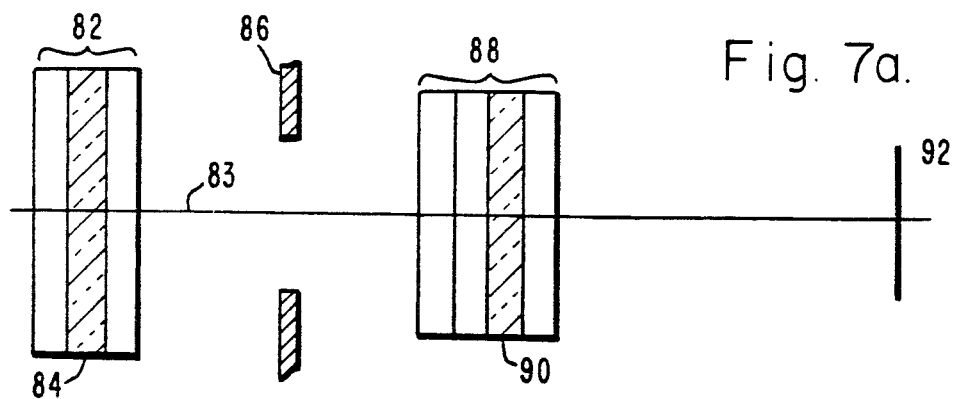
FIG. 7(a-b) are a general schematic diagram representing two typical optical structures for a telephoto lens. Structures are shown for both a conventional lens and an equivalent lens employing the principles of the present invention.
Figure 7B:
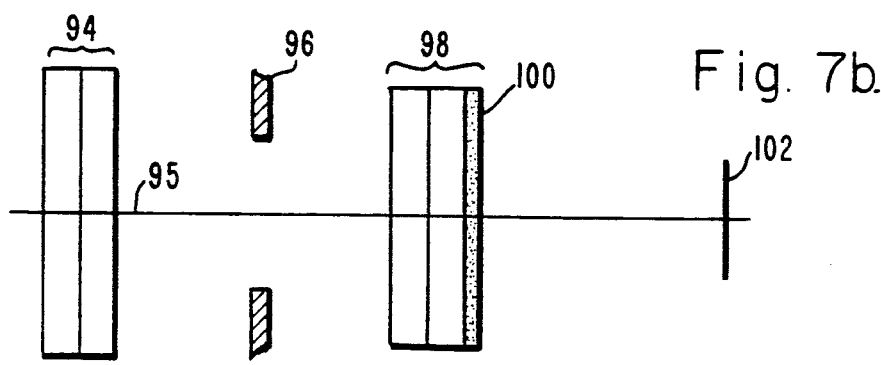

FIG. 7 includes general schematic diagrams for two telephoto lenses that contain an internal aperture stop. Each of these structures employs two lens groups. FIG. 7a shows a typical conventional structure, and FIG. 7b shows a comparable structure employing the principles of this invention.

In the conventional structure, input lens group 82 at the left end of optical axis 83 contains refractive elements. In this example, the central element 84 of three is made of special optical glass. Next to the right is aperture stop 86. Lens group 88 to the right of the aperture stop has overall negative optical power and contains refractive elements. In this example, third element 90 from the left (out of four elements) is made of special optical glass. Image 92 is formed at the right end of the optical axis.

Significant features of the conventional structure in FIG. 7a are summarized as follows. Special optical glass must be used in lens group 82, lens group 88, or both. Aperture size is limited because otherwise it is difficult to correct simultaneously for spherochromotism and secondary color. Because more optical elements are needed than for the structure of FIG. 7b, the structure of FIG. 7a is larger.

FIG. 7b shows a typical equivalent structure for a telephoto lens that employs the principles of this invention. Input lens group 94 has positive overall optical power and in the figure is located at the left end of optical axis 95. This lens group may contain both refractive and diffractive elements. Next along the optical axis is the aperture stop 96. Lens group 98 next to the right has negative optical power and may contain both refractive and diffractive optical elements. In the example of FIG. 7b, two elements are refractive, and the third 100 on the right is diffractive. It is understood that detailed arrangements and locations of such refractive and diffractive optical elements within lens group 98 other than those described in this example are consistent with the spirit of this invention. Image 102 is formed at the right end of the optical axis.

Comparison of the two telephoto lens structures in FIG. 7 demonstrates substantial advantages obtained from the use of this invention. The glass-diffractive structure of FIG. 7b, is smaller and lighter because fewer optical elements are required. No special optical glass is employed. Spherochromatism and secondary color can be corrected simultaneously through the use of diffractive optical elements in lens group 94, lens group 98, or both. Aperture size is larger than that obtainable in the conventional structure of FIG. 7a.

Figure 8A:
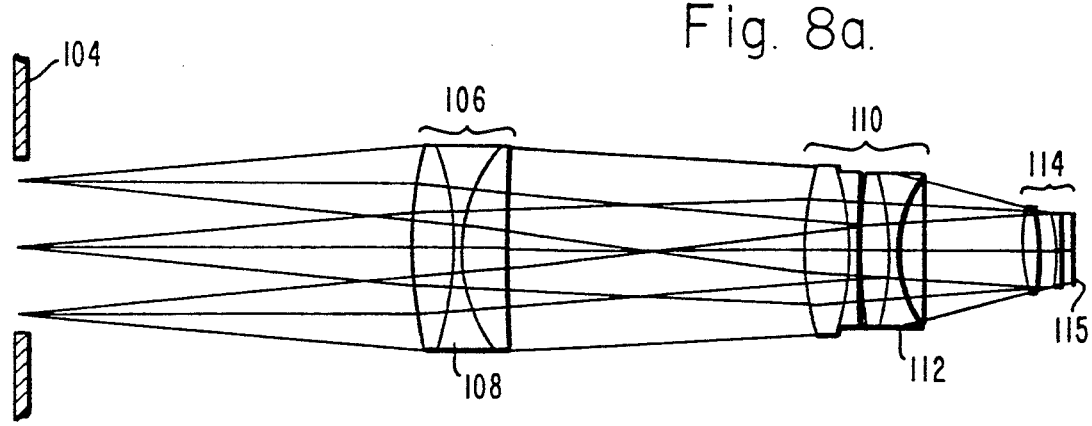
FIG. 8a is a conventional structure with 10 refractive optical elements.
Figure 8B:
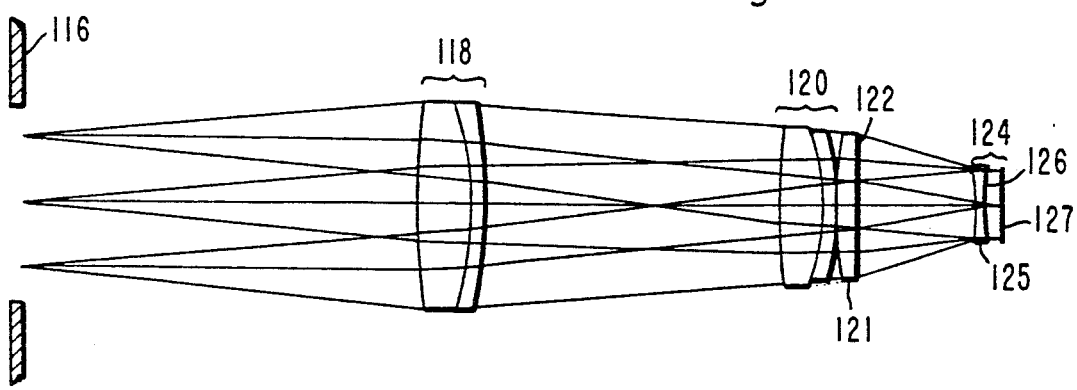
FIG. 8b is a comparable glass-diffractive structure requiring six refractive optical elements plus two diffractive elements.

To illustrate the principles of this invention in a more specific manner, FIG. 8 shows two fully designed optical structures, each for a representative Petzval lens with an external pupil. This example was chosen because while an external pupil is mechanically convenient, it also involves a more difficult optical design. Both structures have the same f-number (f/3.2), the same EFL (3 inches), and the same field of view (10 degrees). FIG. 8a shows a well designed Petzval lens structure with conventional refractive optical elements. FIG. 8b shows a comparable structure employing the principles of this invention.

In FIG. 8a, entrance pupil 104 is followed by lens group 106 having overall positive optical power and containing three refractive elements. The central optical element 108 of this group is made of type KZFSN4 special optical glass. Next along the optical axis is lens group 110 with overall positive optical power and containing five refractive optical elements. The fourth element from the left 112 of this group also is made of type KZSFN4 special optical glass. Finally, field lens group 114 contains two refractive elements. Ten optical elements are required in this glass-refractive assembly using conventional construction from the prior art. Image 115 is formed to the right of lens group 114.

FIG. 8b illustrates a comparable structure employing the principles of this invention. After entrance pupil 116 is shown lens group 118 that contains two refractive elements. Next along the optical axis is lens group 120 that contains three refractive elements plus one diffractive element 122 formed or applied on the left-most refractive element 121. Finally, field lens group 124 contains one refractive element 125 plus diffractive element 126 applied to or formed upon the right surface of refractive element 125. Image 127 is formed to the right of lens group 124.

Comparison between the conventional optical assembly of FIG. 8a and that of FIG. 8b, which employs the priciples of this invention, demonstrates substantial advantages over the prior art in actual workable optical structures. The conventional assembly of FIG. 8a contains a total of ten refractive elements including two made of special optical glass. The assembly of FIG. 8b contains only six refractive elements (none of which requires special optical glass) plus two diffractive elements, which occupy virtually no space. Although such advantages with respect to mechanical construction and lens materials are substantial in themselves, further improvements obtained from this invention extend into the area of optical performance, as will be shown.

Figure 9:
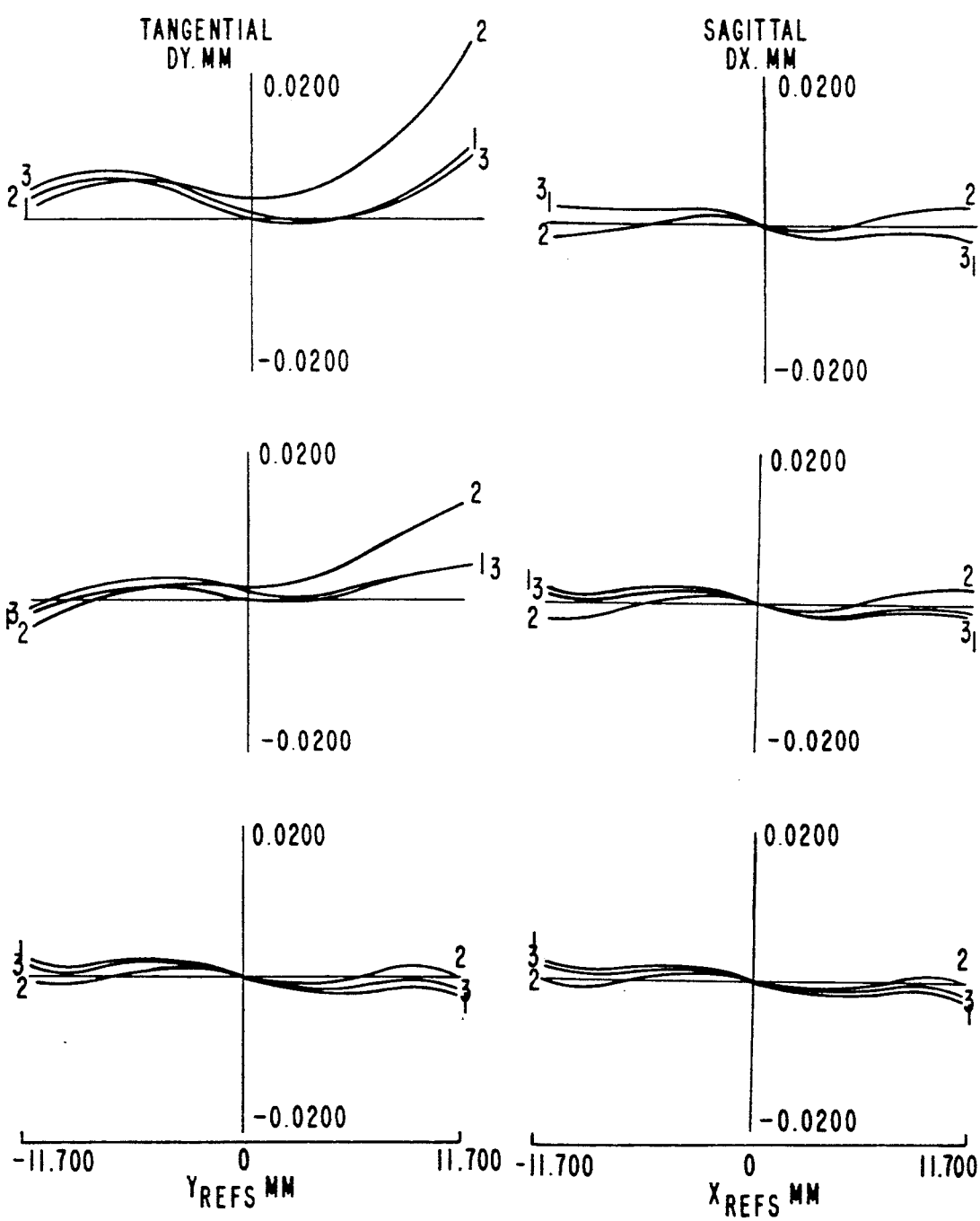
Figure 10:
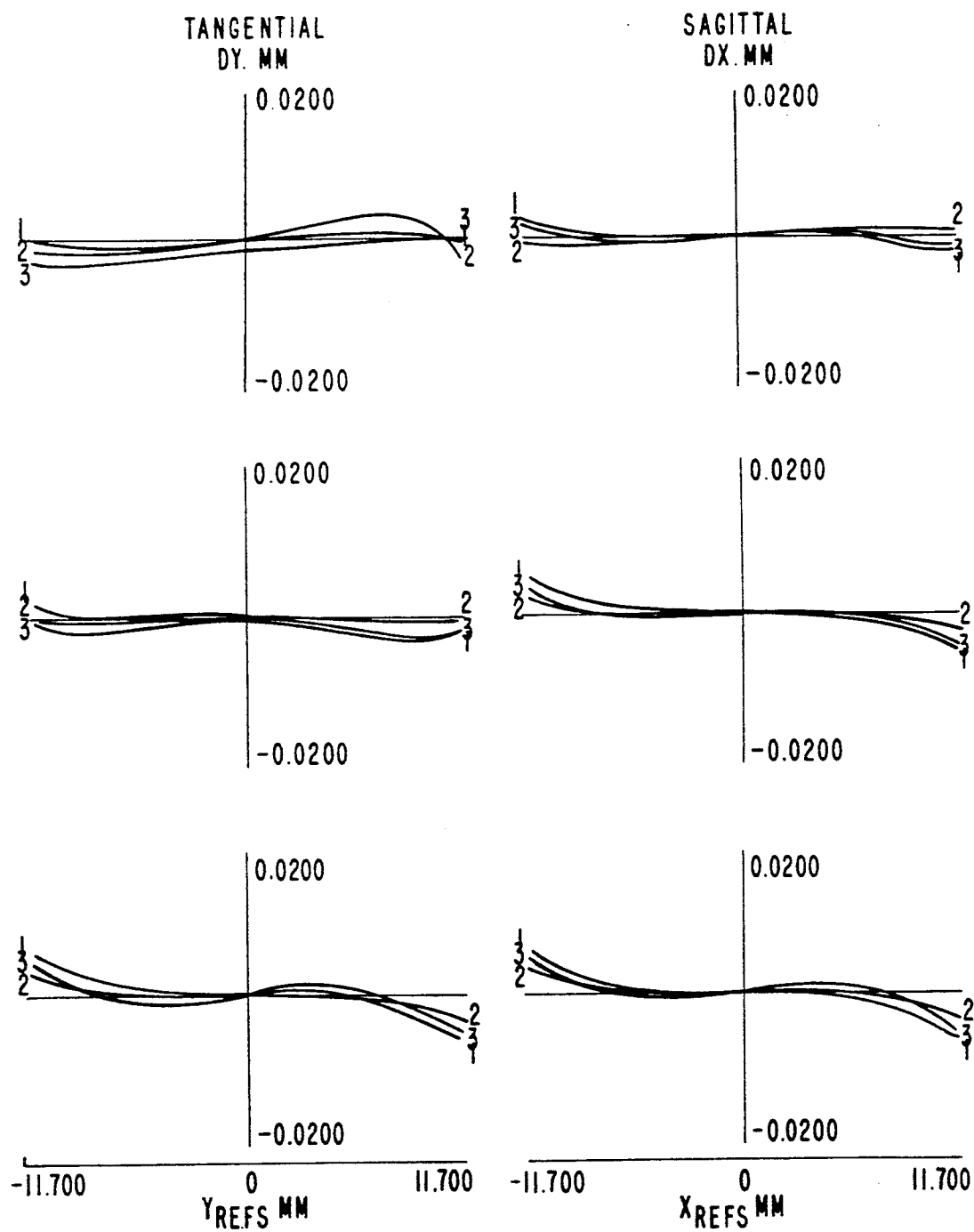
FIG. 10 shows the H tan U optical performance curves for the comparable glass-diffractive lens shown in FIG. 8b.

FIGS. 9 and 10 are employed to analyze and compare the two well-designed structures shown in FIG. 8 by means of H tan U optical performance curves. These curves, which are commonly used by those skilled in the art to analyze optical designs, show the tangential and sagittal aberrations along two designated axes. FIG. 9 shows the H tan U curves for the all glass structure of FIG. 8a. The optical performance of this design would be considered excellent in the prior art. Designations DY and DX refer to the geometric aberrations along the Y and X directions, respectively. Symbols 1, 2, and 3 respectively indicate curves for wavelengths of the d-line, F-line, and C-line. Horizontal axes $Y_{REF}$ and $X_{REF}$ are, respectively, the pupil coordinates along the Y and X axes. Conditions and associated locations for the six groups of curves shown in FIG. 9 are given in Table 1.

TABLE 1

| Conditions for H tan U Curves in Indicated Locations | | |
|---|---|---|
| Field of View degrees | Tangential Geometric Aberration | Sagittal Geometric Aberration |
| 5.0 | top left | top right |
| 3.5 | middle left | middle right |
| 0.0 | bottom left | bottom right |

FIG. 10 shows corresponding H tan U curves for the glassdiffraction structure of FIG. 8b. For FIG. 10, the axes, symbols, conditions, designations, and locations are same as described for FIG. 9 and as shown in Table 1. The glassdiffraction design is clearly superior for all criteria of optical performance indicated by the H tan U curves. Thus, with respect to chromatic aberrations, these comparative analyses with H tan U curves demonstrate the further advantages of this invention over the prior art.

Figure 11:
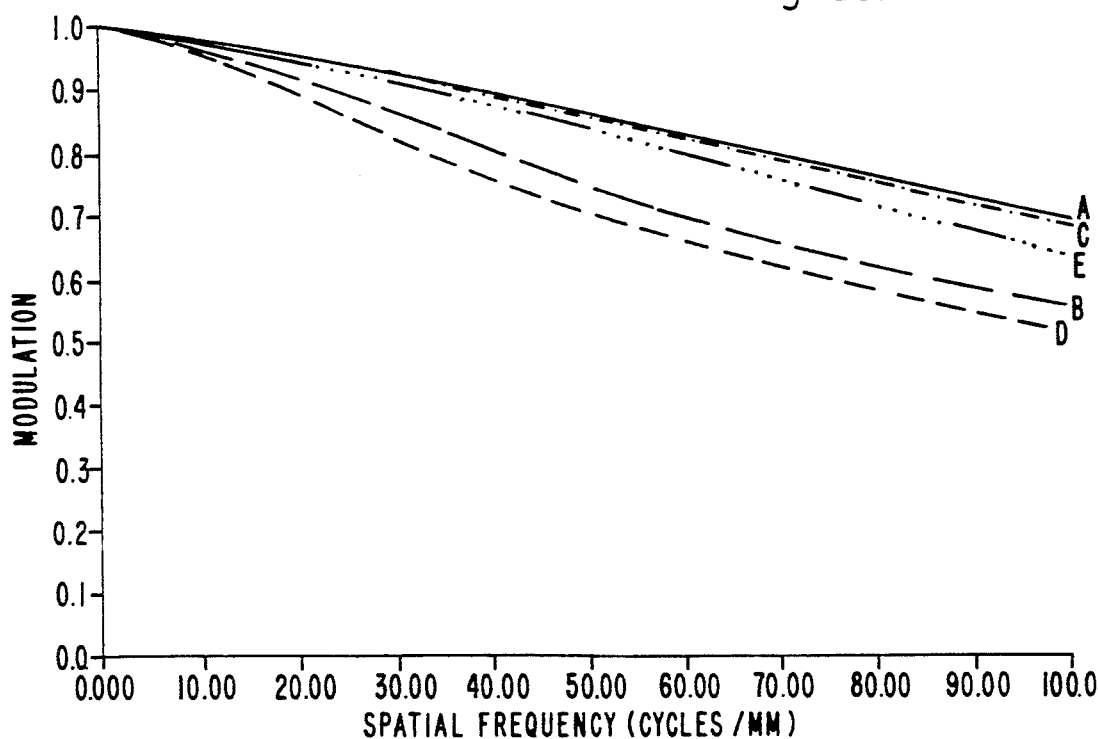
Figure 12:
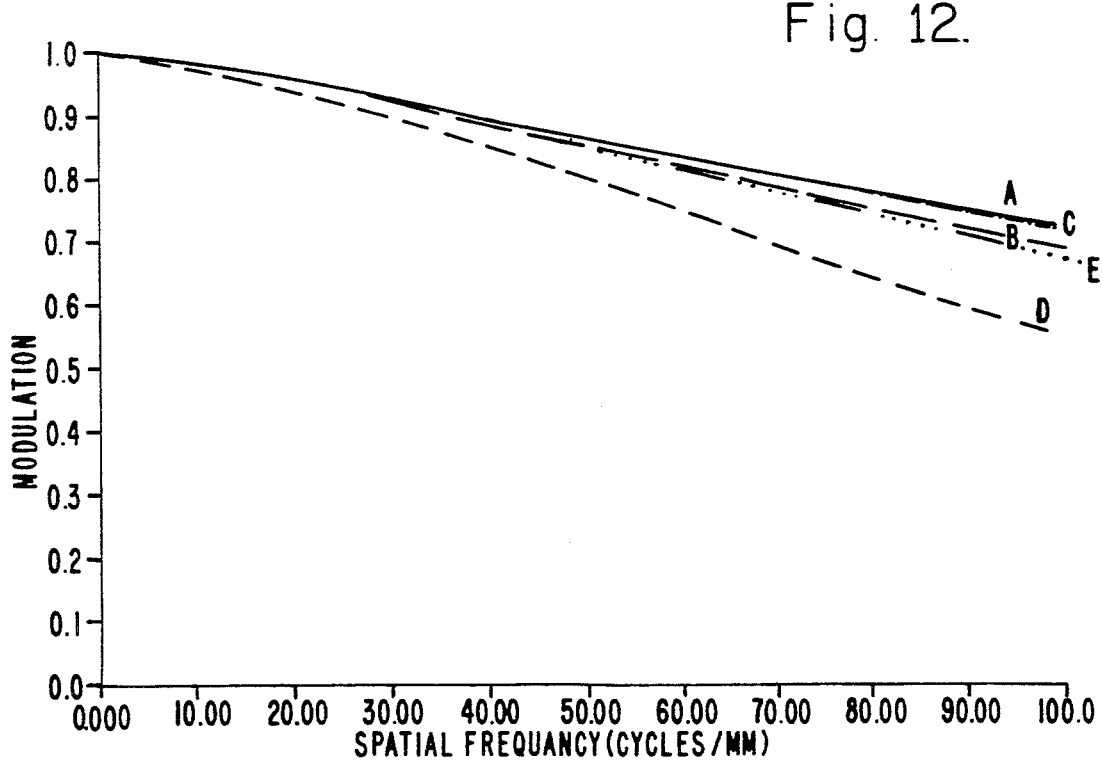
FIG. 12 shows the MTF performance curves for the glass-diffractive lens shown in FIG. 8b.

FIGS. 11 and 12 compare the two structures of FIG. 8 on the basis of modulation transfer function (MTF) out to 100 cycles per mm. MTF curves show the degradation of modulation with increasing spatial frequency and are an additional basis for evaluating optical performance. FIG. 11 shows typical MTF curves for the all glass structure of FIG. 8a. Such performance would be considered excellent in the prior art. Letter notations are employed on the curves in FIG. 11 to indicate type of geometric aberration and field of view; particular meanings of the letters are given in Table 2.

TABLE 2

| Notations for MTF Curves | | |
|---|---|---|
| Field of View degrees | Geometric Aberration | Letter Designation |
| 0.0 | | A |
| 3.5 | tangential | B |
| 3.5 | sagittal | C |
| 4.5 | tangential | D |
| 4.5 | sagittal | E |

FIG. 12 shows corresponding MTF curves for the glass-diffractive structure of FIG. 8b. Letter notations for the curves in FIG. 12 are the same as those given in Table 2. Modulation is substantially better for the glass-diffraction structure at all spatial frequencies. On the basis of the MTF criterion, additional advantages in superior performance obtained from the use of this invention are evident.

Figure 13:
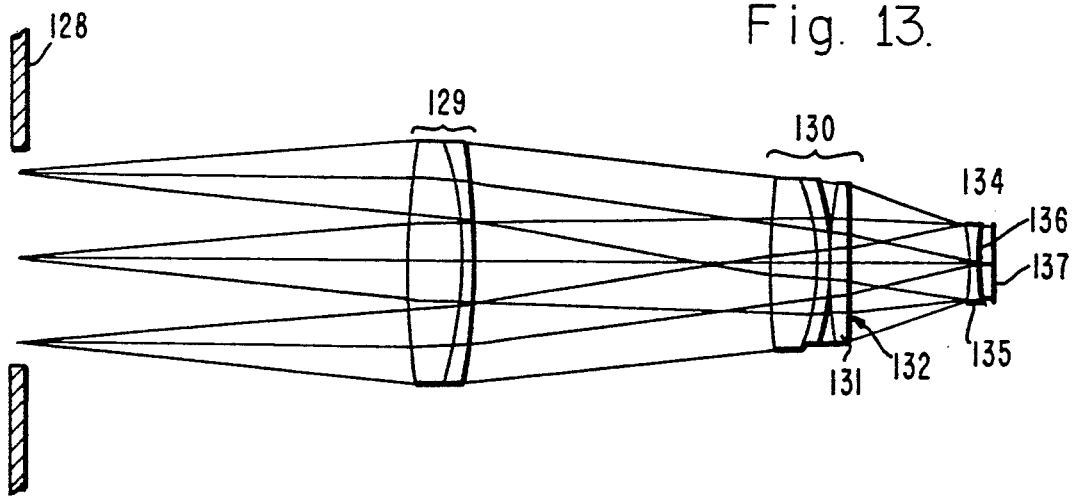
FIG. 13 shows a glass-diffractive structure for a Petzval lens similar to that of FIG. 8b, but with a reduced f-number of f/2.5. Six refractive elements plus two diffractive elements are required.

FIG. 13 illustrates an optical structure that is similar to the glass-diffraction structure of FIG. 8b but for which f-number has been reduced from f/3.2 to f/2.5. This greatly improved specification provides an additional basis of comparison between the optical performance of the typical all glass structure of FIG. 8a with that obtained from the use of this invention, as will be shown.

Entrance pupil 128 is shown at the left of FIG. 13. Lens group 129 with positive overall optical power contains two refractive elements. Lens group 130 with overall positive optical power contains three refractive elements plus a diffractive element 132 applied or formed on the left-most diffractive element 131. Field lens group 134 contains one refractive element 135 plus a diffractive element 136 applied or attached to element 135. Image 137 is formed to the right of lens group 134.

Figure 14:
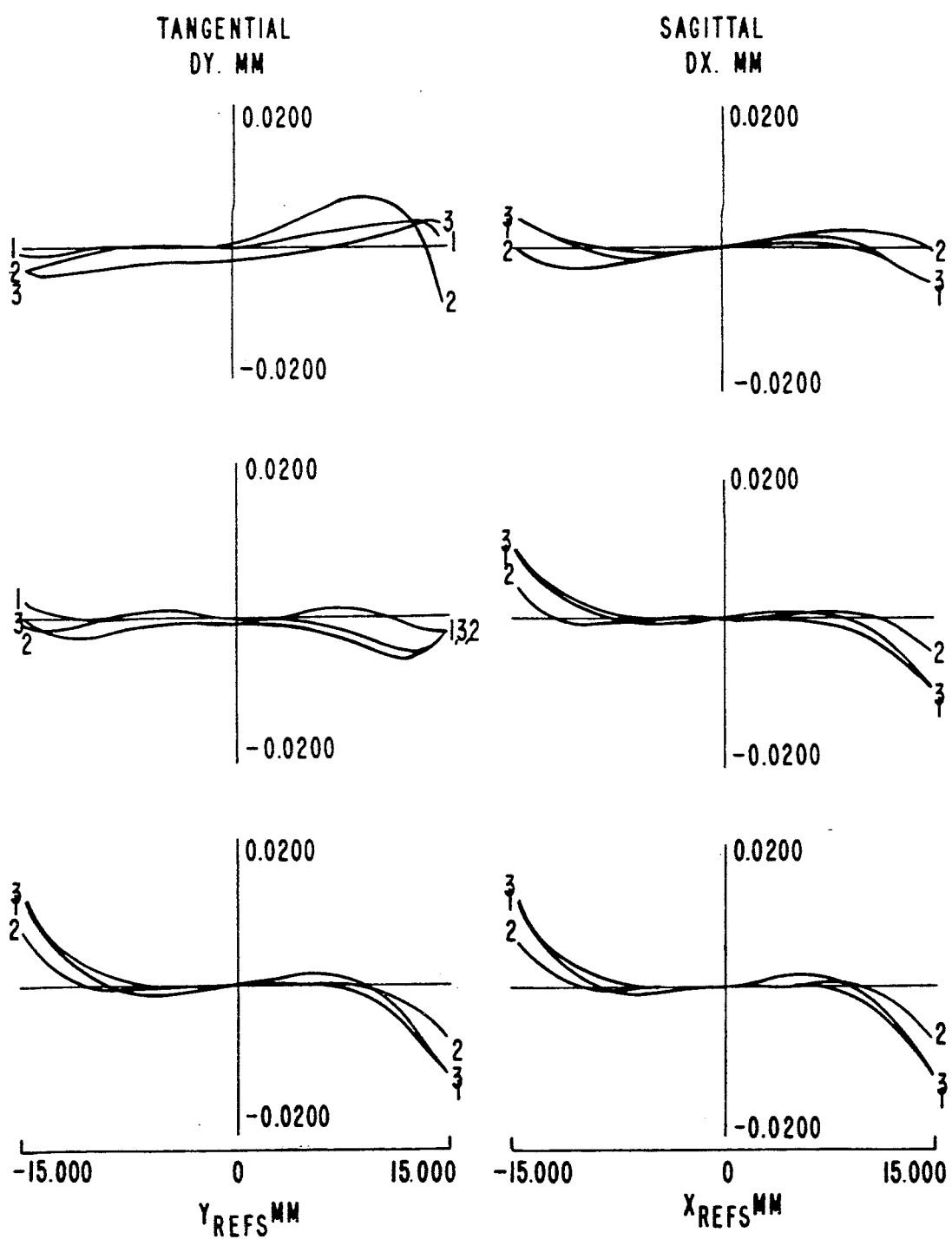
FIG. 14 shows the H tan U optical performance curves for the glass-diffractive lens shown in FIG. 13.

FIG. 14 shows H tan U performance curves for the glass-diffractive structure of FIG. 13. For FIG. 14, the axes, symbols, conditons, designations, and locations are the same as described for FIG. 9 and as shown in Table 1. Comparing FIG. 14 with FIG. 10 shows the expected degradation of optical performance that reflects the significant burden of reducing the f-number from f/3.2 to f/2.5. Comparing FIG. 14 with FIG. 9, however, provides further indication of the superiority of this invention. These H tan U curves demonstrate that optical performance of the f/2.5 glass-diffraction structure of FIG. 13 is still superior to the comparable f/3.2 glass-refractive structure of FIG. 8a.

What is claimed is:

1. An optical structure that forms an image and comprises a combination of a plurality of refractive type optical elements and at least one diffractive type element wherein the chromatic aberrational contributions of said refractive type optical elements having characteristics with one algebraic sense and the chromatic aberrational contributions of said diffractive optical type elements having characteristics opposite with respect to said algebraic sense are essentially cancelled out by means of suitable arrangement and relative location of said optical elements plus suitable distribution of optical power among said optical elements of said structure so as to minimize net chromatic aberrational effects in said image.

2. An optical structure as defined in claim 1 that is a Petzval type lens that forms an image and that comprises a plurality of lens groups each having positive optical power plus a field lens group, with each said lens group containing a plurality of refractive type optical elements, and with each said lens group having an alternative of employing at least one diffractive type optical element.

3. A Petzval lens structure as defined in claim 2 that arranged along an optical axis comprises an input lens group with a plurality of refractive type optical elements, an internal aperture stop, a second lens group with a plurality of refractive type optical elements and at least one diffractive type optical element, and a field lens group, the said optical elements being suitably arranged and relatively located to correct said image simultaneously for:
 (a) spherochromatism, primary color, secondary color, lateral color, and secondary lateral color with at least one diffractive optical element employed in either said input lens group or said second lens group, and
 (b) field curvature and lateral color with at least one diffractive optical element located in said field lens group.

4. An optical structure as defined in claim 1 that is a large aperture lens with external pupil and that comprises a plurality of lens groups each with positive optical power plus a field lens group; each said lens group contains a plurality of refractive type optical elements and an alternative of at least one diffractive type optical element.

5. A large aperture lens with an external pupil as defined in claim 4 that along an optical axis comprises said external pupil, an input lens group containing a plurality of refractive type optical elements, a second lens group that contains a plurality of refractive type optical elements and at least one diffractive type optical element, and a field lens group that contains at least one refractive type optical element and/or at least one diffractive type optical element element, the said optical elements being suitably arranged and relatively located to correct said image simultaneoulsy for:
  (a) spherochromatism, primary color, secondary color, lateral color, secondary lateral color, and chromatic coma by means of at least one diffractive element employed either in said input lens group or in said second lens group, and
  (b) field curvature and lateral color by means of at least one diffractive optical element employed in said field lens group.

6. An optical structure as defined in claim 1 that is a telephoto lens that comprises a plurality of lens groups, each said lens group having either positive or negative optical power; each said lens group contains a plurality of refractive type optical elements and an alternative of employing at least one diffractive type optical element.

7. An optical structure as defined in claim 6 that is a telephoto lens having along an optical axis an input lens group with a plurality of refractive elements with positive optical power, an internal aperture stop, a second lens group having negative optical power and with a plurality of refractive optical elements and at least one diffractive type optical element, the said optical elements being suitably arranged and relatively located to correct the said image simultaneously for spherochromatism, primary color, and secondary color, and with said diffractive optical elements located within either the said input lens group or the said second lens group.

8. An optical structure as defined in claim 1 and in which correction for chromatic distortion in said image is achieved by means of encoding at least one of said diffractive optical elements with an aspherical wavefront of high order.

9. An optical structure with which an image is observed and that comprises a plurality of refractive type optical elements and at least one diffractive type optical element wherein the chromatic aberrational contributions of said refractive type optical elements having one algebraic sense and the chromatic aberrational contributions of said diffractive optical type elements having characteristics opposite with respect to said algebraic sense are essentially cancelled out by means of suitable arrangement and relative location of said optical elements plus suitable distribution of optical power of said optical elements to minimize the following characteristics observed in said image: spacial distortion and field curvature plus net chromatic aberrarational effects including lateral color and chromatic distortion.

10. An eyepiece lens structure as defined in claim 9, comprising along an optical axis an external aperture, plus at least one lens group with a plurality of refractive type optical elements and at least one diffractive type optical element located within said lens group.

* * * * *